United States Patent [19]

Tanaka et al.

[11] 4,121,505
[45] Oct. 24, 1978

[54] APPARATUS FOR MAKING PAPER CYLINDERS FOR NURSING SEEDLINGS

[75] Inventors: Kiyotaka Tanaka, Yokohama; Isao Gentsu; Mamoru Sunaga, both of Hokkaido, all of Japan

[73] Assignee: Nippon Tensai Seito Kabushiki Kaisha, Tokyo, Japan

[21] Appl. No.: 746,131

[22] Filed: Nov. 30, 1976

[30] Foreign Application Priority Data

Dec. 3, 1975 [JP] Japan .................. 50-142906
Mar. 8, 1976 [JP] Japan .................. 51-24242

[51] Int. Cl.² ................................ B31D 3/04
[52] U.S. Cl. .................... 93/1 H; 93/37 R; 156/558
[58] Field of Search ............ 93/1 H, 1 WZ, 37 SP, 93/37 EC, 37 R, 1 R; 156/556, 558, 561

[56] References Cited

U.S. PATENT DOCUMENTS

| 3,535,190 | 10/1970 | Loomer et al. | 156/558 X |
| 3,809,593 | 5/1974 | Burke et al. | 93/37 EC X |
| 3,837,263 | 9/1974 | Kobayashi et al. | 93/1 H |

FOREIGN PATENT DOCUMENTS 643,621  4/1937  Fed. Rep. of Germany ........... 156/558

*Primary Examiner*—James F. Coan
*Attorney, Agent, or Firm*—Browdy and Neimark

[57] ABSTRACT

An apparatus for making paper cylinders for nursing seedlings in which pasted, cut pieces are transferred, piled and stuck together by pressing, the apparatus includes transfer members positioned to receive cut pieces, the transfer members including a rotary cylinder having a surface provided with a plurality of grooves and a plurality of air passageways which open to said surface and extend from air holes in the cylinder pieces. A lamination table is positioned in the vicinity of the rotary cylinder. A pressing mechanism is positioned in the vicinity of the lamination table, the pressing mechanism including a pressing member fixed to a bell crank shaft in correspondence to the grooves so as to be reciprocated between the grooves and the table by motion of the bell crank shaft, edge aligning means are mounted on ends of the bell crank shaft for aligning both side portions of the cut pieces by rocking motion thereof. The pressing mechanism and the edge aligning means are connected integrally through a bell crank mechanism and are arranged opposite the lamination table.

1 Claim, 18 Drawing Figures

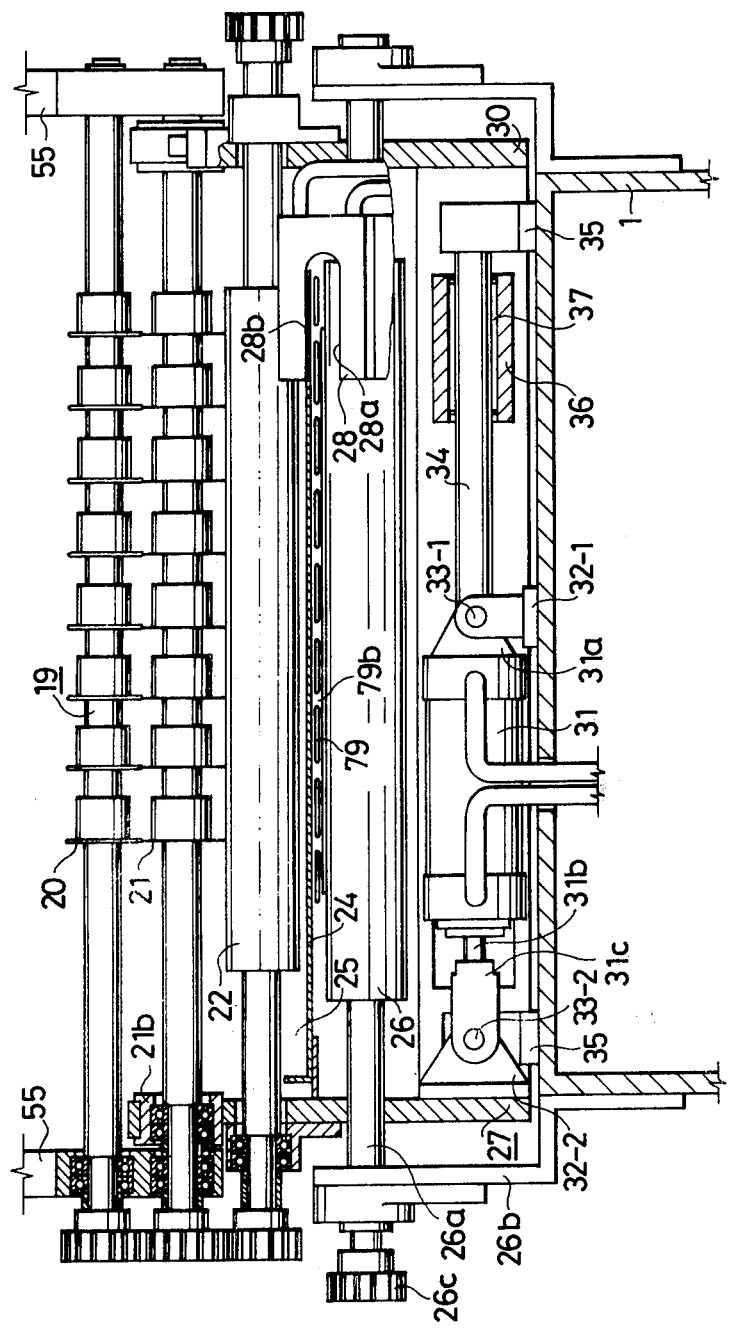

APPARATUS FOR MAKING PAPER CYLINDERS FOR NURSING SEEDLINGS

BACKGROUND OF THE INVENTION

The present invention relates to an apparatus for making paper cylinders for nursing seedlings and, in particular, to the making of a group of cylinders for nursing seedlings having single or double walled partitions. A pasting machine is moved right and left according to a meandering of strip bodies fed out of a press nipping pasting device and an error due to operation speed of the device is adjusted to attain correct pasting.

Heretofore, two kinds of paper cylinders for nursing seedlings have been known, one having single walled partitions and the other having double walled partitions; the former is made by pasting longitudinal paper tapes, and on the contrary the latter uses a flattened tube. However, in both cases, paper tapes are offset by a given breadth and pasted together face to face each other into a strip body of a full-feather pattern cross-section, and thus obtained an full-feather pattern strip body is, after the pasting, cut into pieces of a given length, these pieces are laminated and press joined together, thus resulting in a product. An apparatus has been proposed for making paper cylinders for nursing seedlings which has double walled partions, and this is made by a process comprising cutting a raw paper into tapes of a given breadth, applying a non-water soluble paste to one side edge of the tape and pasting to the other side edge into a flattened tube, and applying a water soluble paste on the upper face of said flattened tube, thereafter overlapping them by a half of breadth by means of a breadth displacement device thereby pasting the together into a half-feather pattern cross-section body, then pasting said half-feather pattern bodies together face to face, and after a time interval during which the first adhesion of the obtained full-feather pattern cross-section stripped tape assembly has completed, cutting the striped tape assembly into pieces of a given length, and producing a paper tube assembly for nursing seedlings by means of an apparatus for pasting together a given number of the cut pieces. However, in obtaining the full-feather pattern strip, it is impossible to make the each breadth of full-feather pattern strip and the pasting position of the flattened tube included therein completely same. This is due to the fact that paper is used and therefore there is a difference in the waiting period after the pasting in the full-feather pattern strip making process, resulting in a difference of drying and contraction thereby giving bad accuracy of face to face pasting of the strip. Accordingly, when the strip is cut into pieces of a given length and the pieces are pasted together, the pasting positions deflect and thereby the development can not be done regularly, resulting in giving, deformed filling spaces.

This provides degraded products and due to the production apparatus which requires an waiting period, it can not be completed as a full continuous apparatus.

It is the principal object of the present invention to overcome the above-mentioned drawbacks and to provide an apparatus for attaining the object.

The foregoing object is achieved by providing an apparatus which provides half-feather pattern arrangements by applying paste on paper tube flattened tape-like bodies or tape-like raw papers and overlapping by a half breadth thereof one over another, and pasting one half-feather pattern arrangement to another half-feather pattern arrangement face to face. At the same time the apparatus produces a full-feather pattern strip body (FIG. 1, B), and effects the first pasting of said strip by means of a press apparatus using endless belts, and provides a detector for detecting very small deflection of the passing position of the full-feather pattern strip resulting from the meandering of the endless belts at a position immediately after the press apparatus. A mounted rocking apparatus follows the meandering motion between the rocking apparatus and the paste applying apparatus and thereby solves the meandering by moving the paste applying apparatus right and left, and also provides correct pasting to the full-feather pattern strip faces. A paste omitting device is provided in the paste applying apparatus. The running speed of the strip is detected thereby causing pasting recess at correct given intervals in accordance to the running speed of the full-feather pattern strip. Correct cutting to make cut pieces of a given length is effected, a given number of the cut pieces is received in a rotating cylinder as a lamination press joining apparatus. The apparatus has a recessed groove and a hole which communicates with an air hole acting as both sucking and blowing air holes for attracting the cut paper pieces by suction, rotating them and blowing them off, to place them on a lamination table. Pressing members are provided on the lamination table, the pressing members being adapted to reciprocate between the groove and the piece face on said lamination table and an edge aligning device which aligns the sides of the cut pieces arranged on the laminating table, said pressing members and said edge aligning device being opposed integrally via a bell crank mechanism.

BRIEF DESCRIPTION OF THE DRAWINGS

FIG. 3A is a detailed view of a paste applying apparatus;

DETAILED DESCRIPTION OF THE PREFERRED EMBODIMENTS

Figure 1:
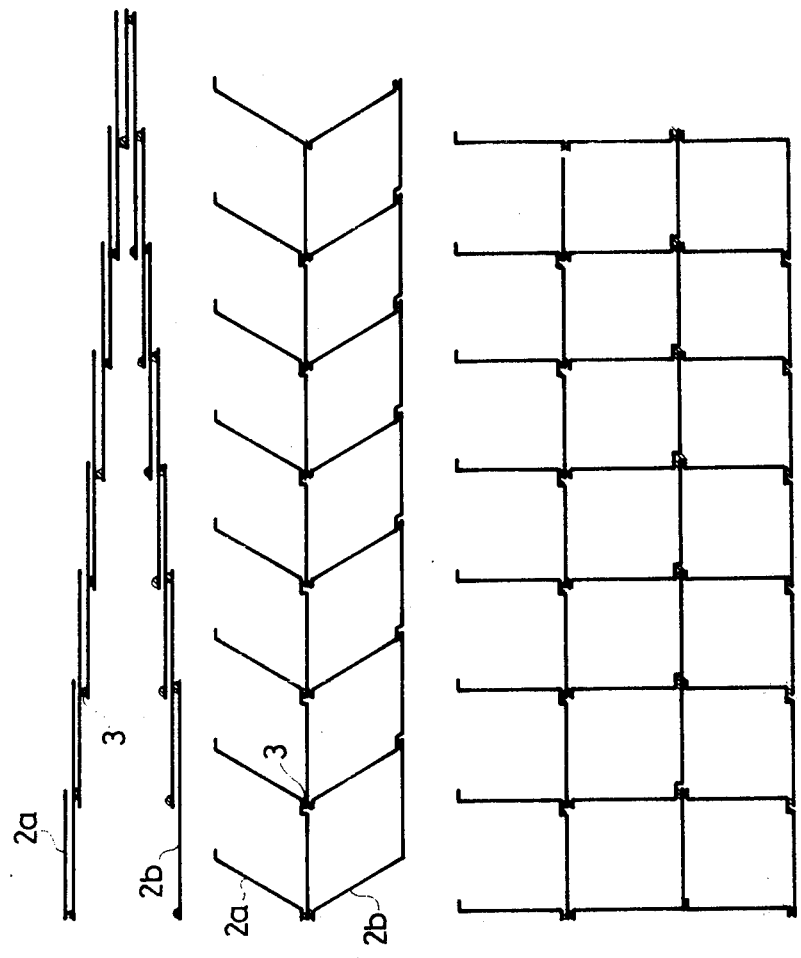
FIGS. 1 A - C are views showing steps of producing products using the present invention.

In the drawings, 1 is a machine frame, 2a 2b are tape-like stock papers provided by pulling a coiled stock paper (not shown) out and cutting it along the pulling direction thereof by a given breadth, wherein 2a is for the upper half-feather pattern strip and 2b is for the lower half-feather pattern strip, and the stock paper is cut into tapes by a means not shown in the drawings in a conventional manner, and a paste line 3 is applied along the side edge of the lower tape and these tapes are overlapped by a half of the breadth thereof one over another thereby making half-feather pattern strips respectively.

Figure 2:
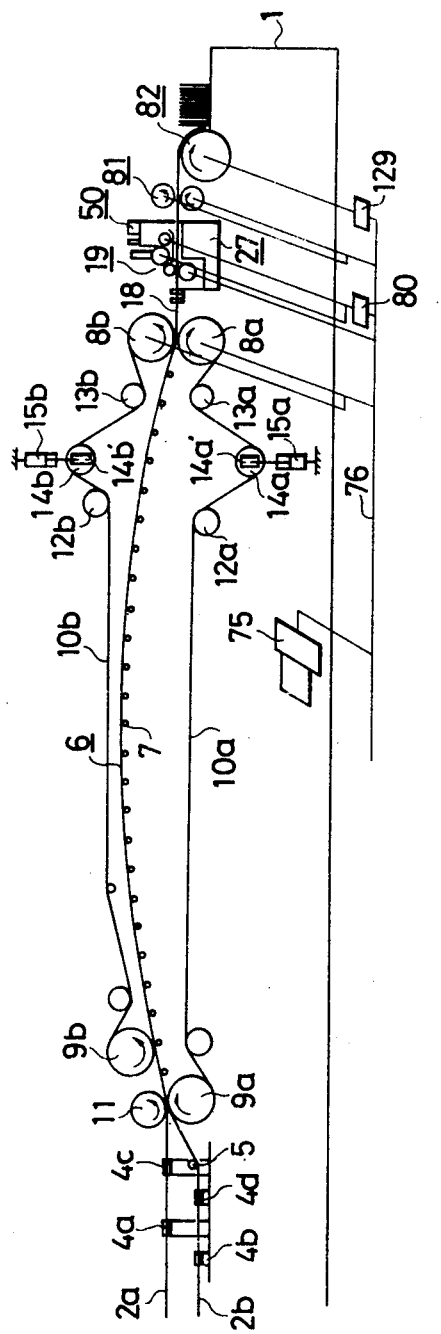
FIG. 2 is a view showing a production process sequence and an arrangement of an exemplary embodiment of the appratus of the present invention.

In FIG. 2, 4a and 4c are upper regulating devices, and 4b and 4d are lower regulating devices, which are fixed on the machine frame 1 and adapted to guide tape like stock papers for said half-feather patterns strip 2a and 2b respectively to a given location.

A guide shaft 5 is provided, and the tape like raw paper 2b for the lower half-feather pattern strip is aligned with the tape like stock paper 2a for the upper half-feather pattern strips at both sides thereof, and these strips are press-nipped by a press-nipping apparatus 6 in the next step while transferred and thereby lamination pasted together into a full-feather pattern strip, and at this time the first pasting of paste used for the sticking has been completed. This press-nipping apparatus 6 has carrier rollers 7 of a broader breadth than breadth of the full-feather pattern strip 18 arranged at given intervals in an arched arrangement on the machine frame 1. A head pulley 8a and tail pulley 9a are pivotally mounted on the machine frame 1 at the forward and the rearward portions in the apparatus 6 and a first endless belt 10a is spanned therebetween via the carrier rollers 7. A second endless belt 10b is spanned opposite to the first endless belt 10a over a press roll 11, a tail pulley 9b and a pulley 8b mounted at a position opposite to the head pulley 8a, the press roll 11 being mounted opposite to the upper face of the tail pulley 9a and the tail pulley 9b being mounted adjacent to the press roll 11 and opposite to the first endless belt 10a on the machine frame 1. Each of the endless belts 10a, 10b runs at the same speed, pressing to each other adjacently, thereby transferring the full-feather pattern strip 18 interposed and press-nipped therebetween.

Guide rolls 12a, 12b, 13a and 13b tension rolls 14a and 14b, and tension adjusting apparatuses 15a and 15b are are provided. In the adjusting apparatuses, oil pipings (not shown) are connected to an oil pump 39 through a pressure control valve, and each endless belt 10a, 10b is stretched through tension roll guides 14a' and 14b', stretching the tension rolls 14a, 14b to obtain a given tension in accordance to the set pressure, and as a result, the full-feather pattern strip 18 is transferred between the belts 10a and 10b continuously for a given period under the press nipping condition, thereby obtaining a strip 18 in which the first pasting has completed.

A rocking apparatus 27 is mounted for rocking motion relative to the machine frame 1 on a frame 30 together with a paste applying apparatus 19 and a paste omitting apparatus 50 as a unit, to which reference is hereinafter made. This construction is such that an oil pressure cylinder 31 is fixed to a bracket 32-1 fixed on the machine frame 1 through a pin 33-1, and the forward end metal member 31c of a rod 31b of said oil pressure cylinder 31 is attached to a bracket 32-2 fixed on one side of the frame 30 by a pin 33-2. On the other hand, the bottom 31a of the cylinder 31 is fixed to the bracket 32-1 fixed to the machine frame 1 through the pin 33-1. A slide shaft 34 is provided, and the flame 30 is fixed to bearings 35 fixed to the machine frame 1 at both ends thereof, and the base portion of a slide bearing 37 fitted slidingly on the slide shaft 34 is fixedly inserted in a bearing holder 36 holding a slide bearing 37 fixed on the frame 30. Accordingly, if the rod 31b moves right and left due to oil pressure applied to the oil pressure cylinder 31, the frame 30 moves right and left through the slide bearing 37 slidingly fitted on the slide shaft 34, in this case the slide shaft 34 acting as a guide.

Figure 3B:
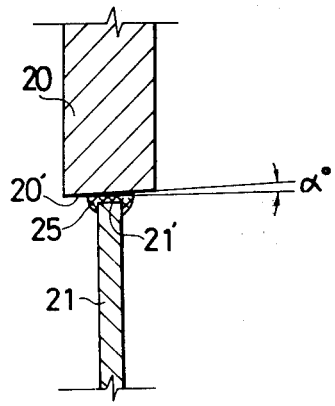
FIG. 3B is a detailed view of the paste upper portion of the paste applying apparatus.

A paste applying blade 20, an intermediate paste transfer blade 21, a paste transfer roll 22, a scraper 23, a paste dish 24 and paste 25 are provided. A rotary shaft 20a of the paste applying blade 20 and a rotary shaft 21a of the intermediate paste transfer blade 21 are pivotally supported in the frame 30, and the intermediate paste transfer blade 21 has a edge body on its periphery and fixed to the shaft 21a, and contacts with the paste transfer roll 22 with its edge body, and the paste transfer roll 22 contacts with the paste 25 in the paste dish 24 supported on the frame 30. The scraper 23 contacts with the periphery of the paste transfer roll 22 immediately after the paste transfer thereon thereby adjusting the amount of application of paste on the periphery of the roll to a given amount and thus making the amount of paste transfer to the intermediate paste transfer blade 21 constant. In this case, as shown in FIG. 3 B, the breadth of the outer periphery 20'of the paste transfer blade 20 is larger than that of the outer periphery 21' of the intermediate paste transfer blade 21, and accordingly the breadth of the paste applying line applied to the strip 18 by the paste 25 transferred to the paste applying blade 20 through the intermediate paste transfer blade 21 after making a constant amount by means of the scraper 23 never becomes larger than the breadth of the outer periphery 20' of the paste applying blade 20, and also there is provided a taper angle α from one side corner to the other side corner of the periperal face 20' of the paste applying blade 20, so that at the time of paste application, the corner edge of the higher portion forms an edge and presses the strip 18 against the flexible pressing roller in such a manner as if forming a groove line thereon so as to provide a sealding, and as a result the paste 25 flows only toward the corner side of the lower portion, so that the paste applying line to the strip 18 becomes approximately constant in breadth with a constant straight line existing on the side of the higher corner side portion.

A rubber roll 26 is fitted on a shaft 26a which is freely mounted on a bracket 26b fixed on the machine frame 1 opposite to the paste applying blade 20 thereunder, and a belt pulley 26c is fixed at one end of the shaft 26a. A two-point photoelectric tube 29 is provided, which tube comprises two photoelectric tubes 29 located on a bracket 28c fixed on the frame 30 and across one side edge of the running strip 18 at an interval of 3–5m/m in the horizontal direction of the transverse breadth of paper. Normally the strip 18 runs at the center portion of the two photoelectric tubes 29.

Figure 4:
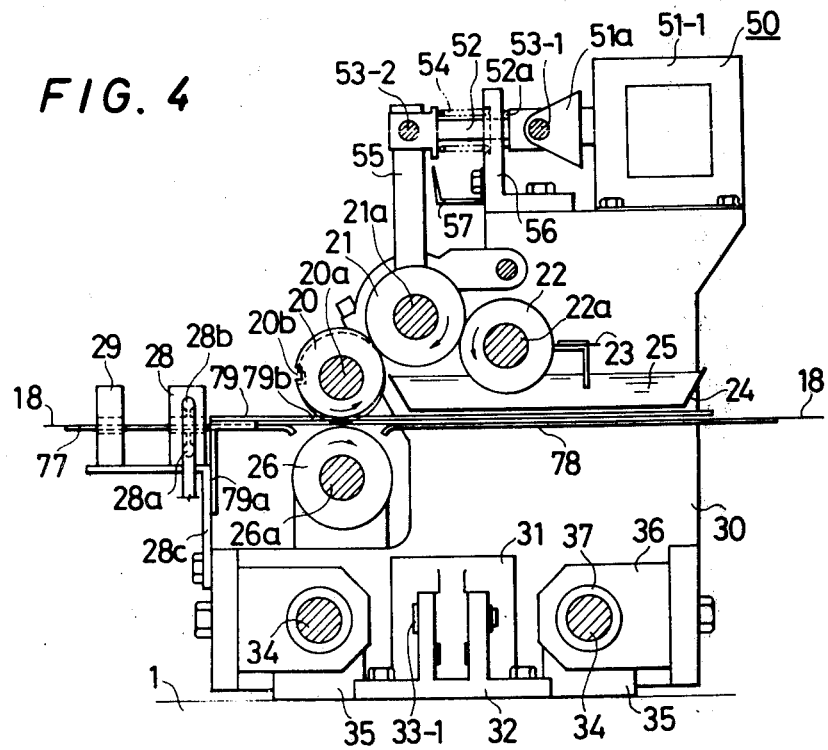
FIG. 4 is a detailed view showing an apparatus for applying paste on one side of a full-feather pattern strip pasted together face to face.
Figure 5:
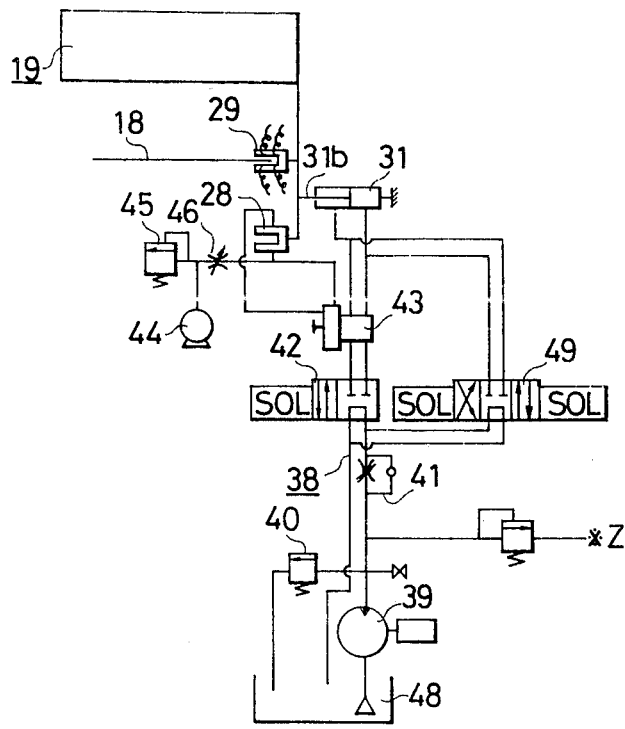
FIG. 5 is an explanation view of a mechanism for preventing the meandering of the full-feather pattern strip.

An edge detecting apparatus 28 of elongated C-shape is located adjacent to the two-point photoelectric tube 29 and operatively arranged to allow one side edge of the strip 18 to run in the elongated C-shaped groove therof, and provided with a pair of upper and lower air blowing nozzles 28a, 28b fixed in a bracket 28c, which are located correspondingly of the contacting line between the paste applying blade 20 and the rubber roller 26. Accordingly, the side edge of the strip 18 is always detected and the resulting signal is transferred to an oil pressure circuit mechanism as shown in FIG. 4 to attain the control. Explaining more in detail, 38 is a follow-up control apparatus, 39 is an oil pressure pump directly connected with a motor, 40 is a relief valve, which is applied to open and relieve pressure oil when the oil pressure fed from the oil pressure pump 39 exceeds a given set valve, thereby maintaining a constant maximum pressure thereof. A throttle valve 41, a solenoid valve 42, an oil pressure servo-device 43, a receiving tank 48, an air pump 44, a relief valve 45, and a throttle valve 46 are provided. The throttle valve is adapted to open and relieve air when air pressure fed from the air pump 44 exceeds a set valve, thereby maintaining a constant maximum pressure thereof. Accordingly, when the throttle valve 46 is adjusted, a given amount of air flow is blown out from the lower blowing nozzle 28a of the edge detecting apparatus 28 and on the other hand gets into the high pressure side diaphragm chamber contained in the oil pressure servo-apparatus 43. On the other hand. A low pressure air flow getting out from the upper blowing nozzle 28b of the edge detecting apparatus 28, from a high pressure air pipe contained in the oil pressure servo-apparatus 43 through a given nozzle opening flows out opposite to the nozzle 28a and gets in the low pressure side diaphragm chamber, and thereby the diaphragm is allowed to be balanced with the assistance of a spring contained in the oil pressure servo-apparatus 43. Normally, the edge of the strip 18 is located at the center portion between the high and low pressure air flows of the upper and lower blowing nozzles 28a and 28b of the edge detecting apparatus 28 to maintain the balanced condition, and when the strip 18 causes a meandering a little (for example, meandering to the right in the direction in which the detected air flow becomes blocked further, in FIG. 3), the high pressure air flow getting to the upper blowing nozzle 28b becomes less. As a result, the low pressure air flow encounters less resistance accordingly, and escapes from the upper blowing nozzle 28b resulting in a minimum pressure fall, and this resultant amount of pressure change diaplaces the diaphragm in the direction of the low pressure side diaphram chamber and thereby the pressure oil flows to the left of the oil pressure cylinder 31 through the engaged oil pressure servo-mechanism 43, thereby moving the rod 31b to the right and moving the frame 30 to the right. Also, in the case the strip 18 moves to the left, the reverse operation occurs. The frame 30 and the edge detecting apparatus 28 move right and left as one unit and thereby the side edge position of the strip 18 is always positioned at the center of the edge detecting apparatus 28, so that if the paste applying apparatus is mounted in engagement therewith, it follows up right and left running deviation of the strip body 18, resulting in pasting at a given position always. An electromagnetic paste omitting apparatus 50 comprises solenoids 51 - 1, 2, an iron core 51a, a rod 52, a stopper 52a, and a pin 53-1. The iron core 51a and the rod 52 are connected by means of the pin 53-1, and the rod 52 is usually pushed forward by a spring 54 which engaging one end to the end to the rod 52 and the other end to a bracket 56 fixed to the frame 30, and the stopper 52a is partly fixed in engagement with the bracket 56. A rod 55, the upper end of which is connected by means of a pin 53-2, and the lower portion thereof forms a bearing portion and is rotatably fitted on the shaft 21a of the intermediate paste transfer blade 21. Further its lower end has the shaft 20a of the paste applying blade 20 rotatably freely fitted thereon, and the rod 55 pivots about the shaft 21a thereby raising the paste applying blade 20 upward. A leaf spring 57 is provided, when electric current supplied to the solenoid 51 is cut off, the spring prevents the lag of separation of the iron core 51a due to the residual magnetism. The spring 57 is unnecessary in the case that the solenoid itself includes such a spring.

Figure 6A:
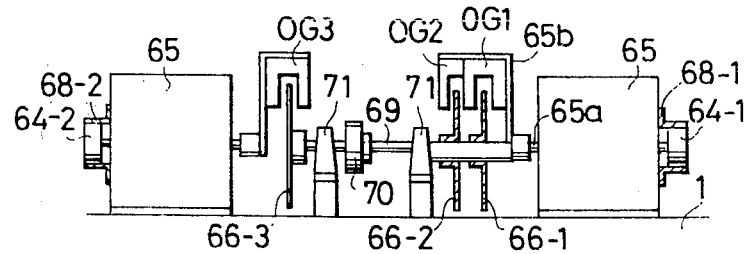
FIGS. 6 A and B are detailed views showing a follow-up device of a paste omitting apparatus which follows up the change of running speed of the full-feather pattern strip.
Figure 6B:
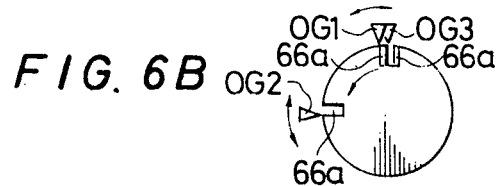
Figure 7:
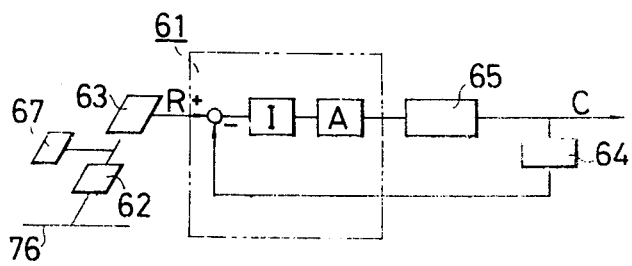
FIG. 7 is a circuit diagram of a pulse generating follow-up device.
Figure 8:
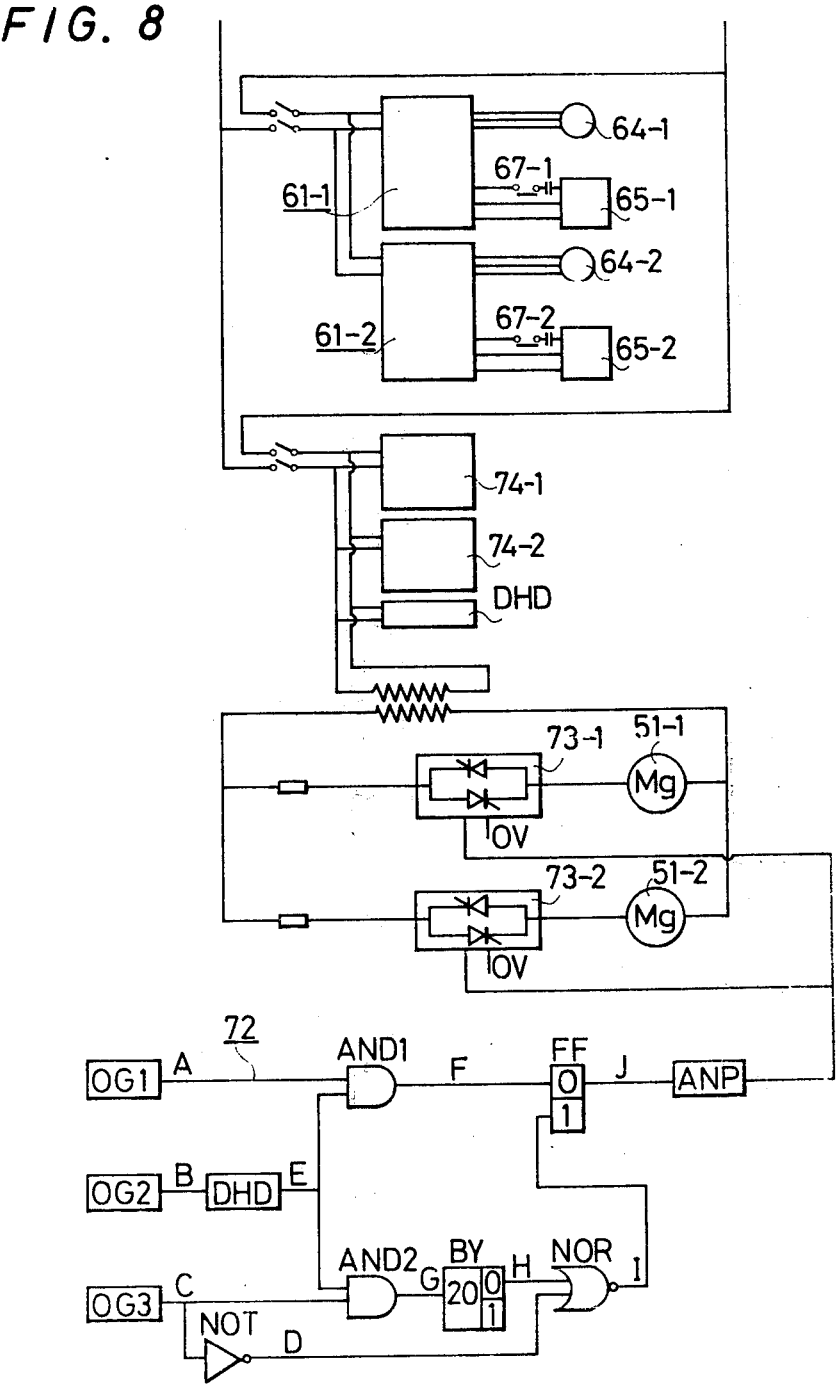
FIG. 8 is a paste omitting control circuit diagram.

Explaining the operation of the paste omitting apparatus 50 with reference to FIG. 6 and the following drawings, 61 is a diagramatical view of a pulse generating follow-up device mounted in a control panel, and 62 is a tachogenerator which is rotated from a counter shaft 76 and generates a voltage proportional to the rotary speed of the counter shaft 76. A ratio setting device 63 is a device which converts the voltage from the tachogenerator 62 to a voltage of 0–10 V and in which a variable set valve R is provided and in the comparison portion, a comparison with a voltage generated from the rotary angle of a potentrometer 64 - 1,2 is performed and the resulting deviation is controlled so as to perform an integral action thereby producing a control signal, and said signal is amplified by an amplifier A to produce an output, and this is supplied to a control motor 65 and thereby a servomotor contained therein is rotated reversible so that an output shaft 65a is reversible rotated via a reduction mechanism container therein, and thereby an arm 65b fixed to the output shaft 65a is angularly displaced and photoelectric tubes OG1 - 2 and OG3 mounted on the arm 65b respectively move by follow-up to each positions corresponding to the rotary speed, and thereby a pulse is generated at a notched groove 66a of a disc 66-1-3.

A voltage sensor 67, in which a rotary speed below a given rotary speed in the low speed range, detects a voltage of the tachogenerator 62 and causes it to operate, and the electric source from the output terminal to the control motor 65 is cut off so as not to change the position of the photoelectric tube OG. A fixture 68 for the potentiometer 64 is fixed at the side face of the control motor 65-a disc shaft 69 and a timing belt pulley 70 are provided. The pulley receives the power from the counter shaft 76. A bearing 71 which freely supports a shaft 69 rotatably is mounted on the machine frame 1. Both ends of the shaft 69 have discs 66-1 -2 and 66-3 fixed thereto, and the relative position of the notched groove 66a is such that the disc 66-2 exists 90° ahead the disc 66-1 and the disc 66-3 is located at a position which exists a little behind the disc 66-1.

A paste omitting control circuit 72 is provided, OG 1-3 are photoelectric tubes, DHD is a digital counter, AND 1-2 is an AND element, FF is a flip-flop element, NOT is a NOT element, NOR is a NOR element, BY is a binary element, and ANP is an ANP element. These elements are respectively composed of non-contact elements, and the outputs from the photoelectric tubes OG 1-3 provide driving outputs of the symobols A, B and C, and the digital counter DHD receives the output B as a pulse input, and counts up to a preset numeral (number of pieces to be passed together) and then this counting circuit is instantly reset to 0 (zero), and again initiates the counting of the input pulses. On the other hand, when counted up, an output is set, and the symbol E is given in which the output is reset at the third input pulse from the start of holding, and using this set signal as synchronizing signal, A and B are given to AND 1 as inputs and thereby an output F is obtained, and this is given to the flip-flop element FF as an input, and the self-holding is effected, and the reset described below is effected and an output J is obtained. This signal is amplified by means of ANP thereby resulting in a gate signal of alternating current thyristor switches 73-1 -2, and 100V of alternating current is fed to the solenoids 51-1 -2 thereby attracting the iron core 51a. A method of causing the flip-flop element FF to be reset is to obtain an output G by giving the symbols E and C to AND 2. A set output H is obtained and D is obtained by reversing the symbol C by means of NOT and H and D are given to NOR as inputs, thereby producing an output 1. This is fed as a reset input of said flip-flop element FF thereby obtaining an output.

The alternating current thyristor switches 73-1 -2 cut off the electric source when the gate signal becomes OFF, and thereby the solenoids 51-1 -2 separate the iron cores 51a.

Electric sources 74-1, -2 are provided; source the non-contact element and 74-2 is the photoelectric tube. Since the solenoids 51-1 -2 have respectively constant times required for the attraction and separation, so that in the case where the running speed of the strip 18 changes, particularly when it becomes higher speed, the lag of attraction and separation occurs and the phase of paste omitting deviates in the direction of said lag as well as the length of time of the paste omitting becomes short, and as a result, a standard product can not be obtained. Accordingly, with increasing the speed, the starting position of the attraction and separation of the solenoids 51-1 -2 is made earlier and the operation starting position of the solenoids 51-1 -2 corresponding to the running speed of the strip 18 is controlled to make the phase and the length of time of paste omitting a certain valve. Also, in the low speed range, even if there is a difference between the required times of attraction and separation of the solenoids 51-1 -2, the time length of paste omitting is absorbed by the blade tip notched portion 20b provided in the blade tip ring body of the paste attaching blade 20 and thereby maintained constant, but when it becomes about 200 rpm of the disc revolution number, since the time length of paste omitting changes due to the difference of the required times of the attraction and separation, the electric source of the solenoid is divided into a circuit for making ON and a circuit for making OFF and a pulse generating follow-up device is provided in each said circuit. A driving apparatus 75 is adapted to drive the press nipping device 6, the rubber roll 26 and the paste applying device 19 etc. via the counter shaft 76.

A guide plate 77 is mounted between the press nipping device and the paste applying device. The strip body 18 fed from the press nipping device 6 is slidingly moved on the upper face of the guide plate 77 and onto the rubber roll 26 and applied with paste on its upper surface by means of the paste applying blade 20. Since the strip 18 is pasted assembly composed of a plurality of tape-like raw papers, when it is pushed forward from one side on a plane and the other side thereof is progressed freely, it does not flex on the way of its progress within a given interval, but progresses straightly, and while the strip 18 is running, even if the paste applying blade 20 contacting with the upper surface of the strip 18 is moved, any meandering of the strip 18 does not occur because the paste applying blade 21 and the rubber roll 26 are being rotated, and accordingly it is conducted to confirm the existence of the stop of the strip 18 and move the paste applying device 19 only at the time of running by means of the solenoid valve 42.

A guide plate 78 and a paste sprash preventing plate 79 are provided. The plate 79 is mounted on a bracket 79a supported by the frame 30, and the groove 79b is arranged at the portion of the paste applying blade 20 to clear said blades 20.

Figure 9:
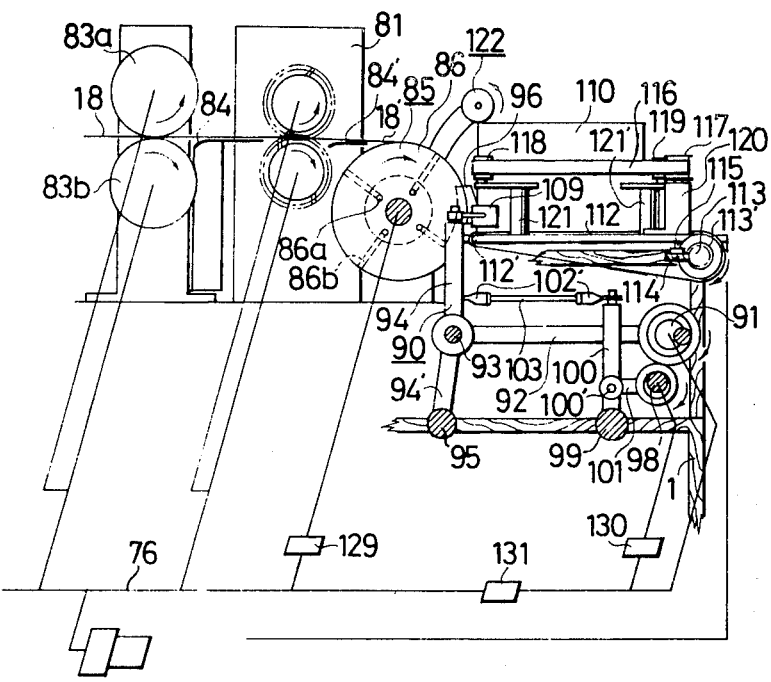
FIG. 9 is a side view of an apparatus for continuously cutting the full-feather pattern strip after the completion of pasting.
Figure 10:
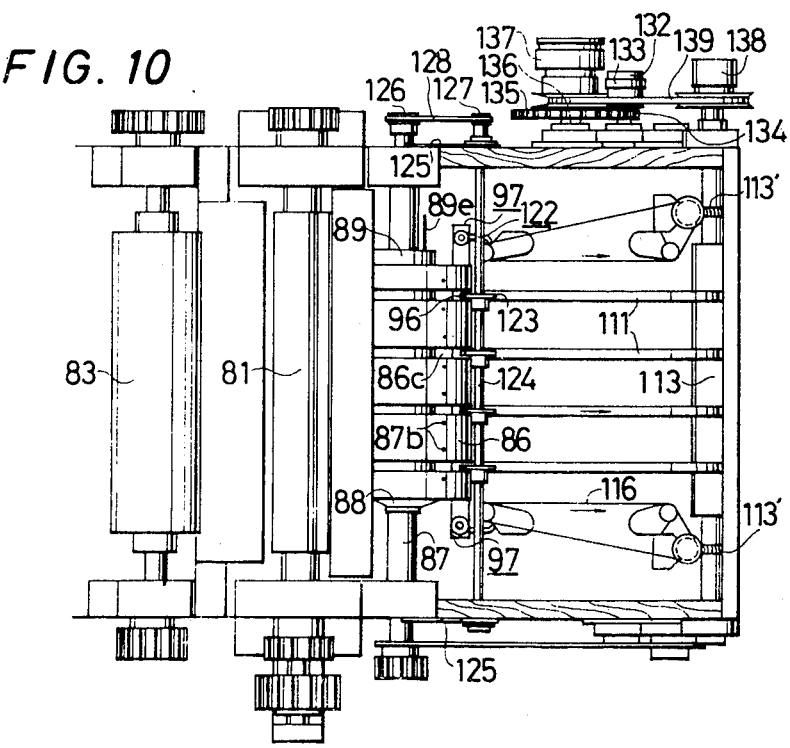
FIG. 10 is a top plan view of FIG. 9.

A phase adjusting unit 80 is provided 81 is a strip cutting device, and 82 is a pile sticking apparatus. The phase adjusting unit 80 has such a function that in order to locate one cut length at the center of the paste omitting portion the phase is allowed to change finely, the one cut length being provided by the blade tip notched portion 20b provided in the paste applying blade 20 of the paste applying device 19 when the strip 18 is cut at given intervals by means of the cutting device 81. The pile sticking apparatus 82 for pile sticking the cut pieces cut off from the strip 18 is shown in FIG. 9 and the following drawings in detail, and for example, 83a and 83b are drawing rolls which have raised and recessed portions on their surfaces and nip the non-pasted portions of the strip 18 therebetween and draw it at a certain speed. Guide plates 84, 84' are mounted in front of and behind the cutting device 81, and the strip 18 is fed to the cutting device 81 at a constant position with the forward ends being sucked to a drum 86, and the non-pasted portions of the strip 18 are cut off by means of the cutting device 81. A transfer device 85, which receives the cut pieces 18' cut by means of the cutting device 81 securely sucks them and transfers them to the next stage. The transfer device comprises a drum 86, a drum shaft 87, a dish spring 88 and a fixed connector, the fixed connector 89 is fixed to the machine frame 1, surrounding the shaft 89; the shaft 87 is freely rotatably mounted in the machine frame 1; the drum 86 is rotatably fitted on said shaft and is always pushed toward the fixed connector 89 by means of the dish spring 89, so that the drum 86 and the drum shaft 87 are rotated in sliding engagement with the fixed connector 89. The drum 86 is also provided with air holes 86a having one end closed parallel to the shaft 89 and the other end opening to the contact face of the fixed connector 89, and holes 86b which are respectively branched perpendicularly from the air holes 86a and opening to the surface of the drum 86 and recessed grooves 86c having a given breadth and depth on the cylindrical face of the drum 86, and the peripheral distance from a hole 86b to the adjacent hole 86b is the same as the length of the cut piece 18' or longer than that, so that when the paper piece 18' is sucked to the surface of the drum 86 the overlapping thereof does not occur. The fixed connector 89 is provided with a suction air hole 89a and a blowing air hole 89b, and when the drum 86 rotates in sliding contact therewith, the paper piece 18' contacts with the drum 86 and then is sucked by a vacuum pump (not shown) connected with 89e through the hole 86b, the air holes 86a, 89a and 89c, and when the cut piece 18' rotates to a given opposite possition of a lamination table 112, it contacts with the blowing air hole 89b, and is blown out by means of a compressor pump (not shown) connected to 89f via 89b, 86a and 86b, and thereby the cut piece 18' is moved to the lamination table 112.

Figure 11:
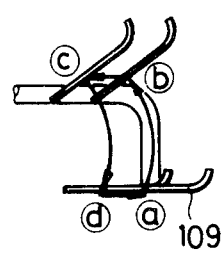
FIG. 11 is a view showing locus described by a lever shaft for aligning the cut pieces.
Figure 13:
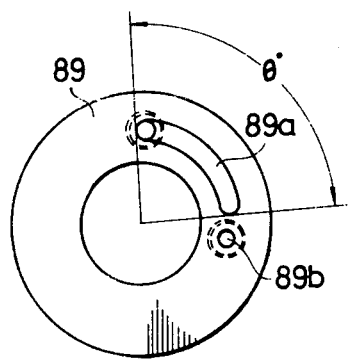
FIGS. 13 A and B are detailed views of a fixed connector.
Figure 12:
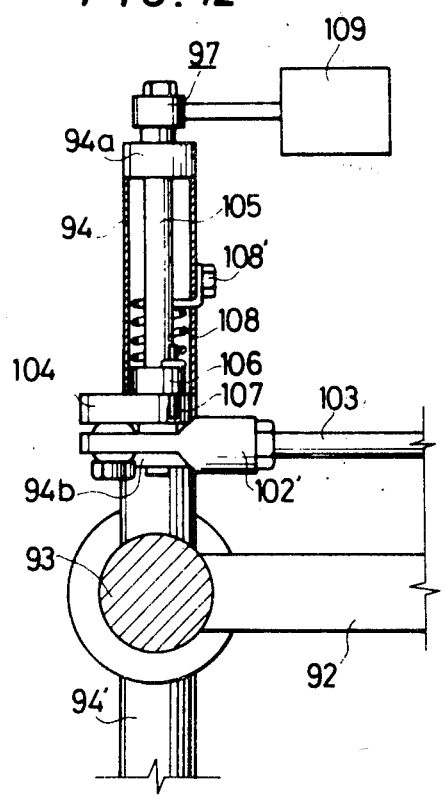
FIG. 12 is a detailed view of an edge aligning stop apparatus.
Figure 13:
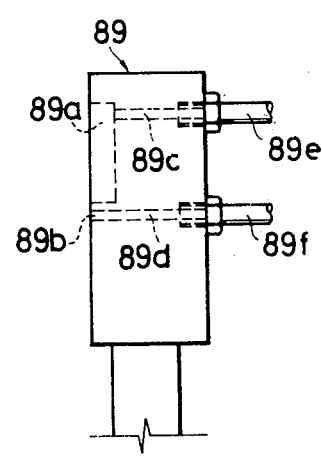

A pressing device 90 is opposed to the lamination table 112, said pressing device is adapted to receive the cut pieces 18' and stand them up normally, and has a bell crank shaft 93 supported by a lever 94' fixed to a shaft 95 freely fitted on the machine frame 1, and is freely fitted on a rod 92 which is rocked by means of a crank 91'. A pressing member 96, which is fixed to the bell crank 93 in correspondence to the recessed groove 86c of said vacuum rotary drum 86, is provided so that it is located at right angles to the crank rod 92, and the rotation of the crank shaft 91 is transmitted through the crank rod 92, and it reciprocates in the recessed groove 86c by the motion of the bell crank shaft 93 moving approximately in the parallel direction without contacting to the bottom of said groove 86c. As a result, the cut pieces 18' on the lamination table 112 are press-stuck together by the pressing member 96. An edge aligning device 97 of the cut pieces 18' is arranged against the lamination table 112, which is at each end of the bell crank shaft 93, and 98 is a crank shaft, 99 is a lever shaft which is rotatable relative to the machine frame 1. A lever 100, which is at each end of the lever shaft 99 is provided and fixed perpendicularly of said shaft 99. A crank rod 101, one end of which is rotatably fitted on the crank shaft 98 is provided the other end of the rod 101 is rotatably mounted on one side of the lever 100 by means of a pin 100'. Rod end members 102 and 102' are provided, 103 is a rod, and 104 is a link. The rod end member 102 is rotatably mounted on the upper end of the lever 100 and the rod end member 102' is engaged with the link 104. Both ends of the rod 103 have respectively a left-handed screw and a right-handed screw, and thereby it is possible to adjust the distance between the lever 100 and the link 104 by screwing the rod end members 102 and 102' appropriately. A rocking shaft 105, which is rotatably supported by the upper bearing 94a of the crank rod 94 and the intermediate bearing 94b is provided, and the shaft 105 has a fixed member 106 fitted thereon and is rotatably freely fitted on the link 104. The fitted member 106 has a pin 107 fixed thereto with both ends thereof projecting out. A spring 108 having the rocking shaft 105 freely inserted therein is provided, and one end thereof is engaged with the upper projection of the pin 107 and the other end is fixed to a part of the crank rod 94 thereby giving an operational force to rotate the rocking shaft 105 in the clockwise direction. In this case, in the edge aligning device 97 at the opposite side, the operational force of the spring 108 is made opposite. The other projection of the pin 107 abuts against the side face of the link 104. One end of the link 104 is bolted in the axial bore of the rod end member 102', and the rod end metal 102' acts as a bearing rotatably connected with the link 104. As a result, the aligning metal member 109 fixed at the upper end of the rocking shaft 105 describes a locus composed by the crank shaft 91 and the crank shaft 98 by rotation of the shaft 105 thereby repeating the motion of $a \rightarrow b \rightarrow c \rightarrow d$ as shown in FIG. 11. A head pulley shaft 113 having a rubber lining applied on the belt engaging portion thereof is provided. A screw gear 113' which is fixed at both sides of the head pulley shaft 113 is provided and engages with a screw gear 114 fixed at a vertical shaft 115 rotatably mounted in the machine frame 1 thereby giving rotation to the vertical shaft 115, and rotating a side conveyor belt 116 of the lamination sticked body 110 engaged with the head pully 117 fitted on the end of the shaft 115. The side conveyer belt 116 is supported by the head pulley 117, a tail pulley 118, a guide pulley 119, a bearing metal member 120 and stands 121, 121', and lies on a lamination plate 112. Accordingly, the cut pieces 18' pushed by the pressing member 96 become a laminated body 110 and supported at both side by means of the conveyor belts 116, and according to the pressing degree the belts 116 and the bottom conveyor belts 111 are rotated in the arrow direction.

An upper end feeding device 122 which rotates in the arrow direction by the power to feed the cut pieces 18', is provided and the shaft 124 is rotatably supported in bracket 125 fixed to the machine frame 1, and discs 123 made by sponge-like material are fixed to the shaft 124 corresponding to the position of the pressing members 96. Accordingly, the cut pieces 18' are pushed at the underside thereof by means of the pressing members 96 and at the upperside by means of the upper end feeding device 122 thereby maintaining the balance of the upper and lower compression.

A pulley 126 is fitted on the rotary drum 87; 127 is a pulley fitted on the shaft 124, and 128 is a rope which is engaged on the pulleys 126, 127. Phase regulating units 129, 130 and 131 which can easily regulate the position where the rotary drum 86 sucks the cut pieces 18' are provided the position where the edge aligning device 97 aligns the transfer deviation of the cut pieces 18' and the position where the pressing device 90 pushes the back portion of the cut pieces 18' to advance them so as to stick them together. A can clutch 132 is fitted on the lever shaft 99, a gear 134 is fixed to the outer annular side face of said clutch 132, and the gear is engaged with a gear 135 fixed to an intermediate shaft 136, one end of which being rotatably fitted to the machine frame 1. A brake belt 133 is wound around the periphery of the cam clutch 132. A non-step change gear R is fixed to the intermediate shaft 136, and 138 is a non-step change gear S fitted to the head pully shaft 113. A V-belt 139 is stretched over the pulleys mounted on the intermediate shaft 136 and the head pulley shaft 113 respectively and transmits the rocking of the lever shaft 99 toward the rotary drum 86. Motion is transmited to the gear 135 from the gear 134 through the cam clutch 132 thereby giving an intermittent rotation to the intermediate shaft 136, so that this intermittent rotation rotates Berucomu non-step change gear S (trade name) intermittently via the V-belt 139 thereby rotating the head pulley shaft 113.

On the other hand, the rotation of the lever shaft 99 to the side of the crank shaft 98 produces slipping due to the action of the cam clutch 132 and the brake body 133 so that the rotation is not given to the head pulley shaft 113, and therefore when the pressing device 90 and both the edge aligning devices 97 act to the cut pieces 18', the bottom conveyer belt and the side conveyer belts 116 stop their actions to make the press sticking sufficient, and when said pressing device 90 and both the edge aligning devices 97 do not act, the transfer of the lamination sticked body 110 is carried out.

A product made by the above described manner is developed and thereby such a product is obtained that has single layered partitions as shown in FIG. 1c.

The present invention comprises the above described construction, in which a wound raw paper of a given breadth is successively uncoiled and applied with paste at given intervals along the drawing out direction thereof, and then cut at given intervals in engagement with the paste applying, folded into tubular bodies, or the tape-like raw papers are displaced breadthwise by means of a breadth displacement device as they are, applied with paste at given positions and overlapped in the transverse breadth one over another in a given manner, or a plurality of raw papers of a broad breadth are arranged and successively uncoiled, applied with paste at given intervals, and are subject to a position regulation by means of respective suitable regulating devices 4, subject to pressing for a given period by means of the press nipping device 6 thereby obtaining a full feather pattern-like strip 18 in which the first sticking force has been completed, and then in the application of paste on the upper face of said strip bodies 18, the past applying device 19 can perform the paste applying under such condition that a fine deviation of the passing position of said strip body 18 due to a fine meandering of the endless belts of the press nipping device 6 is detected by means of the edge detecting device 28 and the paste applying device 19 is moved right and left by means of the rocking device 27 through the follow-up control device 38 to follow up the passing position of the strip body 18, thereby allowing paste application to given positions, and also the press sticking can be done by pressing the backs of the cut piece 18' while aligning the edge of it by means of a pile sticking apparatus 79 including a bell crank mechanism under such a condition that the edges are aligned, and as a result the quality of the product can be improved. Also, the paste omitting device 50 for omitting the paste application at every given interval for making one unit of the products is of electromagnetic type and operated under such a condition that the running speed of strip body, namely the rotation speed of the counter shaft 76 is detected by means of the tachogenerator 62 and the positions of the photoelectric tubes OG 1 - 3 are followed up by means of the control motor 65 through the pulse generating follow-up device 61 which receives a signal from the tachogenerator 62 and thus the lag and change of length of the paste omitting positions caused by the constancy of the respective required times for the attraction and separation of the solenoid 51 and the change of the running speed of strip can be prevented by the combination of the non-contact control circuit 72, and also the distance of paste omitting can be optionally changed by the set number of the digital counter DHD, so that the suitability of the present invention can be applied to the process of production of many sort of products, and according to this invention, the paste applying device can be disposed immediately after the press nipping device, resulting in simplification of the apparatus, and strip off of the paste does not occur and also the continuous production machine can be realized due to removing of the waiting time, and as a result, it becomes possible to produce the products in the saving of power and at a high speed, thereby making the production apparatus perfect.

What is claimed is:

1. An apparatus for making paper cylinders for nursing seedlings in which pasted cut pieces are transferred, piled and stuck together by pressing, the apparatus comprising:

transfer means positioned to receive cut pieces, said transfer means including a rotary cylinder having a surface provided with a plurality of grooves and a plurality of air passageways which open to said surface and extend from air holes in said cylinder for removably attracting the cut pieces;

a lamination table positioned in the vicinity of said rotary cylinder;

pressing means positioned in the vicinity of said lamination table, said pressing means including a pressing member fixed to a bell crank shaft in correspondence to said grooves so as to be reciprocated between said grooves and said table by motion of said bell crank shaft to press the cut pieces on said table; and edge aligning means mounted on ends of said bell crank shaft for aligning both side portions of the cut pieces by rocking motion thereof, said pressing member and said edge aligning means being connected integrally through a bell crank mechanism and arranged opposite said lamination table.

* * * * *